STRIPLINE ADJUSTABLE STUB TUNER

Filed Aug. 6, 1964 2 Sheets-Sheet 1

INVENTOR.
BRIAN M. BELLMAN
BY Wade Koontz and Sherman H. Goldman
ATTORNEYS

March 29, 1966 B. M. BELLMAN 3,243,741

STRIPLINE ADJUSTABLE STUB TUNER

Filed Aug. 6, 1964 2 Sheets-Sheet 2

INVENTOR
BRIAN M. BELLMAN

BY Wade Koontz and Sherman H. Goldman
ATTORNEYS

United States Patent Office 3,243,741
Patented Mar. 29, 1966

3,243,741
STRIPLINE ADJUSTABLE STUB TUNER

Brian Maynard Bellman, Severna Park, Md., assignor, by mesne assignments, to the United States of America as represented by the Secretary of the Air Force Filed Aug. 6, 1964, Ser. No. 388,022
1 Claim. (Cl. 333—82)

This invention relates to stub tuners for microwave transmission lines, and more particularly to an improved apparatus for tuning a stripline microwave transmission line.

Striplines for microwave transmission lines permit the use of the printed circuit method of manufacture or the use of strips of heavier metal separated by sheets of plastic, where required or desired. Its inexpensiveness and simplicity make it very attractive for use in the microwave field, and the ease with which such a transmission line can be switched, attenuated or tuned is a further advantage.

Previous methods of tuning striplines without disassembly were limited to a ratio of the longest stub length to shortest stub length of less than 2:1. The stub on the central conductor was also limited in its dimension and, therefore, caused a limitation in the bandwidth obtainable.

It is a primary object of this invention, therefore, to provide an adjusting stub in a microwave stripline circuit for varying the length of the stub over small increments.

It is another object of this invention to provide an adjusting means for varying the length of a tuning stub where mechanical alignment is non-critical.

It is still another object of this invention to provide a tuning means for stripline microwave transmission lines which has the capability of operation over a wide band of frequencies.

A further object of this invention is to provide such a tuning device which can be inexpensively and easily made of readily obtainable materials that lend themselves to standard, mass production manufacturing techniques.

The above and still other objects, advantages and features of this invention will become apparent upon consideration of the following detailed description of one embodiment thereof, especially when taken in conjunction with the accompanying drawings in which.

Figure 1:
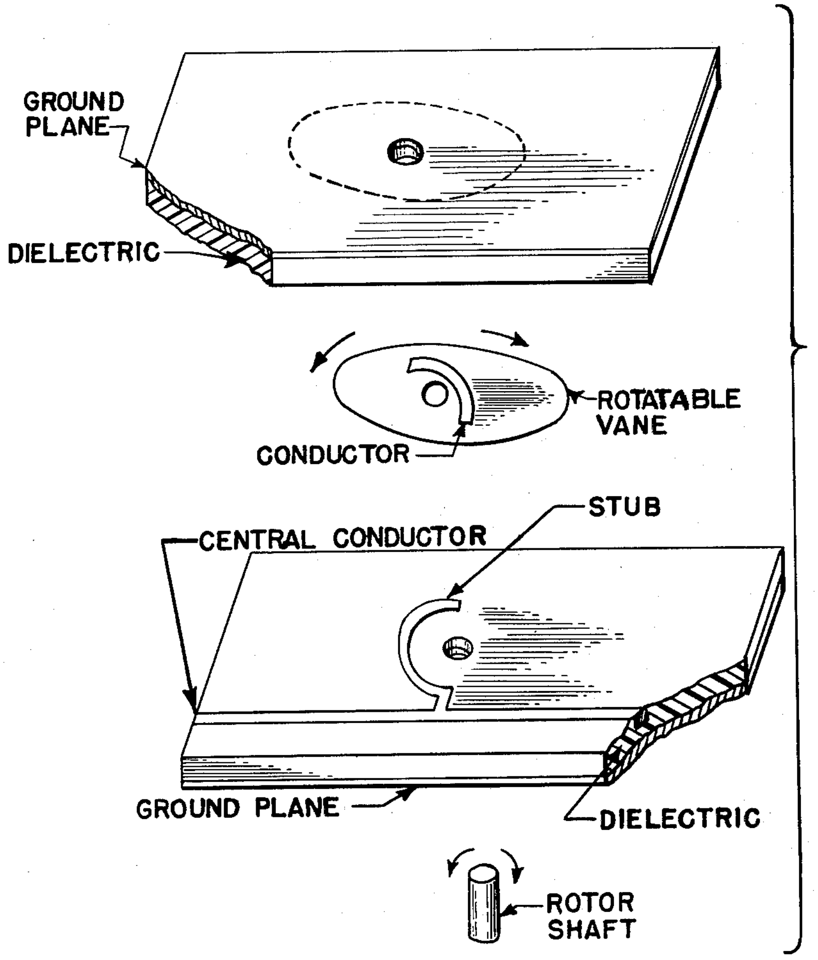
FIG. 1 PRIOR ART
FIGURE 1 is an exploded view of a conventional, prior art, stub tuner for a stripline microwave tuner.

Referring to FIG. 1, there is shown the prior art method of tuning a stripline. Reference may be had to a "Handbook of Triplate Components," ASTIA document No. 110157, which has a description of the type of tuning stub adjustment disclosed in this figure. Basically, there is provided a sandwich arrangement of ground planes which are coated with dielectric with printed circuits on each dielectric sheet. For adjusting a tuning stub the central conductor is printed on the lower dielectric sheet, as shown, while the upper dielectric has a groove therein for mounting rotation a dielecetric rotatable vane with a conductor imprinted thereon. A rotor shaft extends through the assembly for facilitating rotation of the vane. Because of the curvature of the stub and the conductor on the vane, rotation effectively lengthens the stub on the central conductor thereby tuning the transmission line. In this prior art embodiment a ratio of longest stub length to shorter stub length is limited to a ratio of less than 2:1 and the bandwidth is small.

Figure 2:
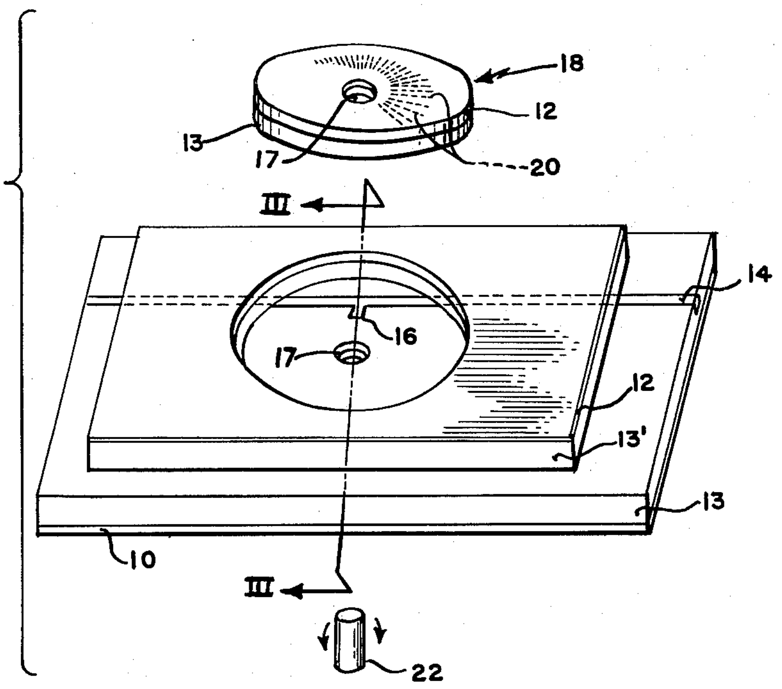
FIGURE 2 is an exploded view showing the mounting of the invention in a section of stripline.
Figure 3:
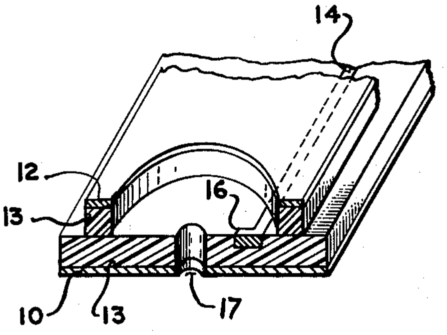
FIGURE 3 is a detailed section of FIG. 2 taken along lines III—III.

An increase in the ratio of longest stub length to shortest stub length may be obtained by utilizing the embodiment of this invention illustrated in FIGURES 2 and 3. The ratio increase provides a wider range over which control may be exercised, and utilization of shorter stub length provides for operation over a wider bandwidth.

The stripline microwave transmission line comprises a bottom ground plane 10 upon which a dielectric sheet 13 is secured. A topmost ground plane 12 is also secured to a dielectric sheet 13'. Imbedded in or printed on the dielectric sheet 13 is a conductor 14 having a short stub 16 as a part thereof. Proximate to the stub, a hole 17 is drilled through the entire assembly of ground planes and dielectric sheets for mounting of a pivot or shaft 22.

The upper assembly of ground plane 12 and dielectric 13 has a circular disc 18 removed therefrom and the dielectric portion of the disc has printed thereon, or otherwise fixed, a series of radial conductors 20 of varying lengths arranged in a crescent shape. The hole 17 may be enlarged in the assembly of ground plane 10 and dielectric 13, in order to allow for rotation of the disc 18, or alternatively, the pivot 22 may be of reduced diameter at its portion within disc 18 in order to allow for rotation of the disc on the pivot. Any means for locking, such as friction or mechanical detents, may be utilized to fix the disc 18 in any desired position. The outer ends of the conductor 20 when the disc 18 is rotated are placed in electrical contact with the stub 16, however, D.C. contact is not required at high frequencies. Thus, the stub tuner's electrical length is varied by rotating disc 18 to bring the different radial lengths of the conductors into contact with the stub 16 on the lower dielectric sheet of the sandwich arrangement.

With this arrangement mechanical alignment is non-critical since discontinuities can only occur at the small area in which the static and rotatable conductors touch, whereas the conventional circuit arrangement has discontinuities over a substantial length of the circuit where the two conductors are in contact.

Thus, I have shown a simple and novel device for tuning a stripline microwave transmission line which is capable of being conveniently adjusted in small increments, covering a wide range of frequencies and permitting non-critical mechanical alignment.

Although the invention has been described with reference to a particular embodiment, it will be understood to those skilled in the art that the invention is capable of a variety of alternative embodiments within the spirit and scope of the appended claim.

What I claim is:

A stripline adjustable stub tuner for microwave transmission lines comprising: a pair of elongated planar conductors forming ground planes, a pair of dielectric sheets, each fixed to one of said conductors, a conductor with a stub on one of said sheets, a crescent shaped series of radial conductors on the other of said sheets, a circular cutout in the upper ground plane and attached dielectric sheet, said cutout containing said crescent shaped series of radial conductors, means for permitting rotation of said cutout such that the conductors of differing lengths arranged in a crescent shape have the ends thereof in succesive electrical contact with the said stub to tune the transmission line as said cutout is rotated.

No references cited.

HERMAN KARL SAALBACH, *Primary Examiner.*

L. ALLAHUT, *Assistant Examiner.*